(12) United States Patent
Bao-Coutado (10) Patent No.: US 7,464,891 B2
(45) Date of Patent: Dec. 16, 2008

(54) FLY FISHING REEL

(75) Inventor: Carlos Bao-Coutado, León (ES)

(73) Assignee: Bawer Technology S.L., Leon (ES)

( * ) Notice: Subject to any disclaimer, the term of this patent is extended or adjusted under 35 U.S.C. 154(b) by 0 days.

(21) Appl. No.: 11/834,885

(22) Filed: Aug. 7, 2007

(65) Prior Publication Data

US 2008/0035774 A1 Feb. 14, 2008

(30) Foreign Application Priority Data

Aug. 20, 2006 (ES) ............................ 200602168
Jan. 20, 2007 (ES) ............................ 200700001

(51) Int. Cl.
*A01K 89/01* (2006.01)

(52) U.S. Cl. ............... 242/317; 242/249; 242/257; 242/295

(58) Field of Classification Search ............... 242/249, 242/257, 300, 301, 304, 317, 295
See application file for complete search history.

(56) References Cited

U.S. PATENT DOCUMENTS

| 2,517,776 | A |   | 8/1950 | Feierabend |         |
|-----------|---|---|--------|------------|---------|
| 2,591,338 | A | * | 4/1952 | Cooper     | 242/256 |
| 3,446,453 | A | * | 5/1969 | Pachner    | 242/256 |
| 4,148,228 | A |   | 4/1979 | Freeman    |         |
| 4,796,831 | A |   | 1/1989 | Sheppard   |         |
| 5,443,218 | A | * | 8/1995 | Ciocca     | 242/256 |
| 5,918,826 | A | * | 7/1999 | Arkowski   | 242/295 |
| 6,053,445 | A | * | 4/2000 | Farris     | 242/303 |
| 7,216,825 | B2 | * | 5/2007 | Oishi et al. | 242/247 |
| 2003/0168541 | A1 |   | 9/2003 | Hill et al. |         |

FOREIGN PATENT DOCUMENTS

| DE | 20 2004 011887 | 4/1979 |
| FR | 2 855 371 | 12/2004 |
| GB | 1 350 533 | 4/1974 |

* cited by examiner

*Primary Examiner*—Emmanuel M Marcelo
(74) *Attorney, Agent, or Firm*—McGlew & Tuttle, P.C.

(57) ABSTRACT

Fly fishing reel. The reel comprises a housing (2, 102, 202), a main axis (3, 103, 203), a swivel driving lever (4, 104, 204) preloaded by elastic recovery means (11, 111, 211) and a first pinion (6, 106, 206) driven by driving lever (4, 104, 204). First pinion (6, 106, 206) is coaxial to main axis (3, 103, 203). The reel also comprises a reel (8, 108, 208) for winding up line (34, 134, 234) that is coaxial to main axis (3, 103, 203) and a brake (9, 109, 209) for spool (8, 108, 208). Between first pinion (6, 106, 206) and spool (8, 108, 208) a gearing (7, 107, 207) is provided. Said gearing (7, 107, 207) comprises at least one planetary train made up of a second pinion (18, 118, 218), at least three planet gears (16, 116, 216) and a ring gear (15, 115, 215). Ring gear (15, 115, 215) is linked to first pinion (6, 106, 206) via a one-way clutch (13, 113, 213).

12 Claims, 11 Drawing Sheets

FLY FISHING REEL

FIELD OF THE INVENTION

The invention relates to a fly fishing reel comprising a housing, a main axis, a swivel driving lever, elastic recovery means for the lever rest position, a first pinion driven by the driving lever, said first pinion being provided coaxially to the main axis, a line wind up spool, provided coaxially to the main axis and a spool brake.

STATE OF THE ART

In the state of the art, manual, semi-automatic and automatic fly fishing reels are known.

The manual reel consists of a spool that can wind up the line mounted on an axis provided with in housing that is attached to the rod. The spool has a handle that allows it to be activated in a circular movement around the axis in the housing in order to retrieve the line. This type of reel does not have a gearing, whereby line retrieval is relatively slow.

It is worth mentioning that in fly fishing, the line is not simply a fishing line wound on the reel. It has at least two parts. At the end of the bait there is a transparent line a few centimeters long called leader, after this a special fly fishing line is tied, known as a fly line, which is characterised by its flexibility. The fly line is not usually very long because of the space it takes up in the spool, so if an extra length of line is needed, an additional line known by its English name, backing, is usually tied to the opposite end of the fly line.

Moreover, manual reels have an adjustable tension spool brake provided between the drum and the spool proper. The main function of the brake is to offer resistance to line feed-out when the fish pulls on the hook. The brake also helps to stop the line from coming out of the spool in an uncontrolled manner during casting, which would increase the risk of tangling the line. One of the drawbacks of the brake in manual reels is that if it is desired to retrieve the catch by activating the handle, the spool is activated directly by the handle. Another additional problem is that when retrieving the line, the brake offers added resistance to the strength of the current and the pulling force of the fish, which requires an additional effort by the angler. This means that if the handle is used to retrieve the line, the risk of losing the catch is high, because the brake cannot compensate the possible whipping action produced by the fish.

In its double function, the brake tension must be regulated optimally. On the one hand it is desirable that, when casting, the brake acts as gently as possible, in other words that the brake be adjusted to a reduced level of tension. On the other hand, when the fish strikes, it is desirable that the brake withstands the force of the fish insofar as it is possible, without breaking the leader. When the tension produced in the leader by the force of the fish is too high, the brake yields. If the level of brake tension is adjusted to the casting, the brake tends to slip excessively when the fish struggles, which does not help when wrestling against the fish to tire it more quickly. If, on the contrary, the braking tension is adjusted to the maximum tension permissible by the leader, the force needed to feed-out the line during casting is considerably increased, which is tiring and also a disadvantage with respect to reaching a considerable casting distance.

Moreover, with this type of reels, when a fish is being caught, the angler has both hands occupied, in other words, one hand holds the rod and the other one activates the handle. Therefore, the risk of losing the fish owing to reduced manoeuvrability is considerable. This means that, in practice, most anglers retrieve the line without using the lever, in other words by pulling on the line. However, in applying this technique there is the risk that if the catch is very big and pulls strongly, the user could burn his hand because of the pressure of the line on his fingers.

Another problem with retrieving the line by hand is the high line tension variations between when the line is being pulled and when it is released to be picked up again at a higher point on the rod for re-pulling with a movement nearer the reel. These tension variations cause the end of the rod to lurch, which makes it easier for the fish to break free from the hook.

With semi-automatic reels, the spool is driven by a gear train, which in turn transmits the driving force from a lever that swivels around an axis. This type of reel also has a spool brake, which operates as in manual reels. In these reels there is also the problem that if the catch is considerably large, the lever force cannot be transmitted to the spool because the brake slips, so the catch must be retrieved by hand as with manual reels. In practice, this type of reel is only appropriate for retrieving the line by activating the lever in a semi-automatic manner, when the catch is small. When the size of the catch is considerable, it is usual to retrieve it by pulling the line by hand. This has the drawbacks already described above.

Neither do the known semi-automatic reels allow all line thicknesses available in the market to be used. This considerably limits the reels' performance, as the larger line calibres cannot be wound.

In particular, the calibre of the fly line depends mainly on the fly fishing technique to be used. Fly fishing has developed considerably in recent years. Initially, the "dry fly" fishing method was used, which consisted in fishing with a single, floating fly. In this case it is important to delicately land the fly on the water surface so as not to alert the fish, and so the fly lines used have a 1 mm calibre approximately. For this technique, the leader used is even finer, and frequently calibres of less than 0.1 mm are used. Another current technique is fishing with a "dropper fly", which is similar to the dry fly technique, but which uses more than one fly simultaneously. The third standard technique is the nymph fly fishing, which is applied to all water types. In this case, the bait are loaded with a small drag so that they do not float on the surface, and instead move with the deep currents. In nymph fly fishing, the leader and the fly line are coarser. For example, the leader for nymph fly fishing can vary between 0.14 and 0.18 mm. Finally, another usual technique is the so-called streamer fly fishing technique, where a small fish imitation is used to feed predator species. The streamers are also loaded, so coarser lines are needed with leaders that vary between 0.2 and 0.22 mm. In the last two techniques mentioned, it is important to reach significant casting distances with a reduced effort, which requires greater line thicknesses. In these cases, the semi-automatic reels of the state of the art are not suitable for the lines required by these two techniques.

Another important factor in fishing with a semi-automatic reel is that due to the reduced spool diameter, the line tends to twist back on itself, causing a shape memory effect. This causes spirals to form in the line that reduce the distance that can be reached during casting. It has been proved that line memory can reduce the casting by several meters. This drawback is particularly inconvenient when fishing in lakes or in the sea, where the dragging effect of the current cannot be used to bring far away fish closer.

Moreover, although it can be applied to various fish varieties, fly fishing is particularly appropriate for catching salmonidae. Its natural habitat is mountain rivers with strong currents, lakes or the sea, and this type of predator fish is characterised by its great strength, speed and craftiness.

When fishing salmon with flies, in many situations the line has to be retrieved very quickly. Semi-automatic fly fishing reels do not always manage to retrieve the line in a semi-automatic manner at the necessary speed, and so the risk of losing the catch is very high.

As mentioned, the third type of reels in the state of the art is the automatic reel. Fly fishing casting consists of a repetitive whip movement whereby distance is gained as the line is fed out manually from the reel. This movement in itself is fairly tiring. Therefore, it is important that fly fishing reels are particularly lightweight. The excessive weight of automatic reels, attached to their not very effective retrieval mechanisms, has meant that this type of reel is not very popular in the market. Also, automatic reels are not very suitable for fishing with nymph and fishing with streamers, because the line calibres that can be used are relatively reduced.

DISCLOSURE OF THE INVENTION

The aim of the invention is to obtain a reel that improves all the problems described in the state of the art. This purpose is achieved by means of a fly fishing reel of the type indicated at the beginning, characterised in that
[h] between said first pinion and said spool a gearing is provided,
[i] said gearing comprising at least a planetary train,
[j] comprising said planetary train a second pinion, at least three planet gears and a ring gear, and
[k] said ring gear being linked to said first pinion via a first one-way clutch.

As mentioned above, in fly fishing there are two very important factors that can increase the number of successful catches. The first factor is the lurching of the rod when the catch is retrieved; the greater the lurching action the easier it will be for the fish to free itself from the hook. It has already been mentioned that both manual line retrieval owing to the strong tension variations, and retrieval using a semi-automatic reel, owing to the lack of speed, increase the lurching action.

The second factor is influenced by the speed with which the line is retrieved; the slower the retrieval speed, the greater the risk of losing the fish. With respect to this second factor it is important, particularly when initially casting the line, to be able to impale the fish quickly enough so that it does not free itself from the hook. Moreover, when struggling with the fish, if the angler can react quickly, he gains a great advantage over his catch.

With semi-automatic reels, although the line tension is much more constant than when retrieving by hand, the gearing ratio is not high enough, and so the driving lever has to be activated several times in order to bring the fish closer quickly enough, which also increases the frequency of the lurching action. In practice, this leads to users tending to retrieve the line by hand with the problem this implies, as described above. It is important that the amount of line retrieved each time the lever is activated be as long as possible so that it is not necessary to retrieve the line by hand.

So, the invention raises the problem of providing a solution whereby it is possible to retrieve the line with the most reduced tension variation possible, in other words the lurching action of the rod, by correcting all the factors that influence this, while simultaneously retrieving the line quickly.

The planetary train has a good gearing/occupied volume ratio, which has meant that the applicant has chosen this innovative solution. The benefits of this solution are evident by being able to take in a greater length of line each time the lever is activated. This reduces the number of times the lurching occurs when retrieving the line in a semi-automatic way, in other words with the lever, with respect to the known semi-automatic reels. Also, the tension variations in the line with semi-automatic retrieval, are greatly reduced in comparison with when the line is retrieved manually, and in particular, the line is never slack. Consequently, the fish does not have the option of shaking the line abruptly to free itself from the hook, and also it has to work much harder, whereby it gets tired more quickly and it is easier to take it out of the water successfully.

In this embodiment, it is also important to highlight the possibility that the driving lever is concentric with respect to the main axis. This arrangement makes it possible to obtain particularly balanced force distributions that prolong the useful life of the reel.

Preferably, the reel comprises a secondary axis parallel to the main axis, with the driving lever swivelling around the secondary axis, and the driving lever comprises a gearing sector at one end that meshes with the first pinion. This means that the gearing to gear train ratio can be increased even further, which improves the line retrieval speed even more.

Preferably, the driving lever has a saddle that connects the lever with the beginning of the gearing sector, and the saddle does not have any teeth, whereby in a line feed-out direction, the first pinion does not activate the driving lever. This characteristic means that in a particularly easy way, during line feed-out, the lever is detached from the movement of the spool.

Preferably, said planetary train comprises four of said planet gears. In effect, this characteristic improves the mechanical performance of the planetary. By increasing the number of planet gears, the force to be transmitted by each meshed tooth, is reduced, whereby the useful life of the reel is extended automatically.

Another of the main problems with the current reels is that the reel brake, which withstands the force of the fish, and prevents the line from being fed out in an uncontrolled manner, behaves like a clutch between the spool and the driving lever. In particular, said brake is an adjustable tension friction brake, located between the lever and the spool in manual reels, and between the gearing and the spool in semiautomatic reels. As discussed, from an ergonomic point of view, it is desirable to adjust the brake tension to the lowest level possible, so that line feed-out is gentle. Nevertheless, the optimum braking tension adjustment for feeding out the line correctly is detrimental when gathering the catch. If the catch to be picked up is considerably heavy or the water current is particularly strong, the brake tends to slide, which means activating the lever is not effective and does not manage to retrieve the line. So, the brake behaves like a clutch, causing the reel to loose efficiency.

In order to overcome the problem of the brake sliding, at present there is only the option of retrieving the line by hand. The disadvantages of manual retrieval have already been widely discussed.

Therefore, preferably, said spool is connected in a mechanically rigid manner to said gearing, with said gearing and said spool forming a rigid kinematic unit, the force of said brake can be regulated continuously, and said brake comprises a free wheel mechanism, with said brake acting upon said rigid kinematic unit, so that in the line feed-out direction, said free wheel mechanism is active, whereas in the line wind up direction, said free wheel mechanism is inactive.

Under the concept of a rigid mechanical connection, it is understood that there is no greater sliding action between both parts other than the actual sliding action attributable to mechanical play. Therefore, for example, between the gearing and the spool there will no clutch type or torque limiting connection that allows the gearing rotation axis and the spool rotation axis to have different rotation speeds. It is precisely this characteristic that considerably improves the characteristics of the state of the art reels, because it prevents the brake from slipping when the catch is pulled in, irrespective of the tension produced on the line. Also, the user has one hand free to comfortably pick up the fish once it is on the shore. Thanks to the fact that there is no sliding action between the spool axis and the gearing axis, and that when the lever is activated slightly there is no sliding action between the lever and the gearing, the lever can act as a line feed-out blocking device.

The concept of free wheel mechanism means, in this invention, that when these connections are active they can transmit force, whereas in their inactive position, they cannot transmit force. So, for example, in the line feed-out direction, when the brake's free wheel mechanism is activated, the brake is performing a braking torque, whereas in the line wind up direction, when the free wheel mechanism is deactivated, the brake does not oppose any mechanical resistance.

Finally, the continuous adjustment of the brake force implies that the force to which the brake is adjusted is not staggered, whereby the braking torque of the brake proper can be adjusted very accurately.

Preferably the reel comprises a second one-way clutch provided between said driving means and said gearing, said brake comprising a free wheel mechanism and said brake action upon said rigid kinematic unit, and said force of said brake is continuously adjustable, so that in the line feed-out direction, said second one-way clutch is inactive and said free wheel mechanism is active, whereas in the line wind up direction, said one-way clutch is active and said free wheel mechanism is inactive. It is worth clarifying that this operating principle is applicable to other gearing, such as gear trains instead of a planetary.

Preferably, the brake comprises break blocks that act upon a brake disc, and the brake is located outside the force gearing flow from the lever to the spool. Effectively, this is a considerable improvement over the state of the art. Unlike the state of the art reels, in the reel according to the invention, the transmission of force from the driving lever goes directly towards the spool. So, parallel to this flow of forces, a brake disc is provided with break blocks attached to the housing, which does not interrupt the flow of forces, and is instead parallel to the flow. This arrangement overcomes the slipping effect when the loads applied to the end of the line are considerable.

Preferably, said brake disc is coaxial to the ring gear and the break blocks are integral with the housing. The invention also intends simplifying the design as much as possible and that assembling and disassembly of the spool can be a comfortable operation. So, although there is the possibility of braking the spool directly, it has been shown to be much more appropriate that the brake disc is integral with the ring gear. This is so, because in fly fishing it is usual to need lines with differentiated calibres that are appropriate for different fly fishing techniques. Many anglers choose to have several spools with different calibre lines, intended to be mounted on one single housing. So, one of the important aspects of the design consists in being able to assemble and dismantle the spool as simply as possible, which is helped if the brake disc is mounted integrally with the ring gear.

As already mentioned, in fly fishing the brakes are needed to withstand the pulling force of the fish and to prevent the line from being fed out in an uncontrolled manner during casting. However, when retrieving, the brake is an additional load to the load of the fish and the water current. Therefore, preferably the reel comprises a free wheel mechanism comprising an outer gear teeth on the ring gear and a second pawl on the brake disc, with the free wheel mechanism acting only in the line feed-out direction.

In fact, deactivating the brake during line retrieval increases the retrieval speed and so it is possible to react better to the movements of the fish. Moreover, the angler can considerably improve the enhanced force when he activates the lever. This again significantly improves the reels known in the state of the art.

Preferably, the brake comprises braking tension regulating means, with these regulating means being made up of a take-up spring and a take-up screw. These regulating elements allow the braking tension to be adapted to each line that is going to be used.

Preferably, the spool has an inner line retrieval diameter and this inner diameter is greater than 70 mm. The spool diameter plays a decisive role in line shape memory effect. The greater the spool diameter, the less the line will tend to adopt a spiral shape, which considerably improves the distance that can be reached by casting with the reel.

Alternatively, said brake comprises a first ring with a first conical surface and a second rotary ring with a second conical surface, with said first and second conical surfaces being suitable for cooperating mutually to generate a braking torque and said second ring and said gearing cooperate mutually via said free wheel mechanism.

Preferably said free wheel mechanism comprises a one-way bearing, with said one-way bearing comprising a third pinion, and a fourth pinion, with said second ring comprising a fifth pinion and said ring gear of said gearing comprising a first outer gear teeth, so that said fifth pinion meshes with said fourth pinion, while said third pinion meshes with said ring gear.

BRIEF DESCRIPTION OF THE DRAWINGS

Other advantages and characteristics of the invention are appreciated following the description below, which, without any limiting character, relates preferred embodiments of the invention, with reference to the accompanying drawings, in which.

DETAILED DESCRIPTION OF AN EMBODIMENT OF THE INVENTION

The reel 1 according to the invention is formed mainly by a housing 2, a driving lever 4, a gearing 7, a wind up spool 8 of line 34 and finally a brake 9.

Housing 2, has a reel support 10 that is provided to attach reel 1 to a common fishing rod anchoring point, not shown in the drawings. In turn, housing 2 has a main axis 3 and a secondary axis 5. Driving lever 4 is mounted on secondary axis 5, which can swivel against the force of elastic recovery means 11 of the rest position. In this case, secondary axis 5 is parallel to main axis 3, however, in an alternative embodiment, secondary axis 5 could be omitted and a driving lever 4 provided that swivels on main axis 3. At one end thereof, driving lever 4 has a gearing sector 12 that meshes with a first pinion 6 mounted coaxially to main axis 3. First pinion 6 also meshes with an appendix 28 of a first pawl 32 of a one-way clutch 13, which is hinged on gearing 7 on an axis of the first pawl and which works against the force of a recovery spring 14.

Gearing 7 is made up of a planetary train. Said planetary train is coaxial to main axis 3 of reel 1. This train comprises a ring gear 15, which meshes with three planet gears 16 carried on a planet gear carrier 17 attached to main axis 3 without the possibility of rotating, and in turn, planet gears 16 mesh with a second pinion 18 mounted freely on main axis 3. Ring gear 15 is mounted freely on planet gear-carrier 17. This one-way clutch 13 allows the movement to be transferred from first pinion 6 to ring gear 15 in the line retrieval movement 34. Second pinion 18 is connected by a positive locking 27 to spool 8.

Brake 9 is made up of a brake disc 19 guided in the radial direction by ring gear 15 and by the brake's free wheel mechanism 20, consisting of a second pawl 29 that engages in an outer gear teeth 30 provided on ring gear 15, whereby a positive locking can be formed with ring gear 15 in the feed-out direction of line 34 from spool 8. Said brake 9 also comprises two break blocks 21 intended to brake the action of brake disc 19. Finally, braking tension regulating means 22 are also provided, consisting of a take-up spring 23, which can be regulated by a take-up screw 24.

As mentioned above, it is usual for the angler to have various spools 8 with different line 34 calibres for each one, which are exchanged according to the different fly fishing techniques used. So, reel 1 provides a quick pressing system consisting of a fixing clip 25 that meshes with an undercutting 26 provided on main axis 3.

Figure 1:
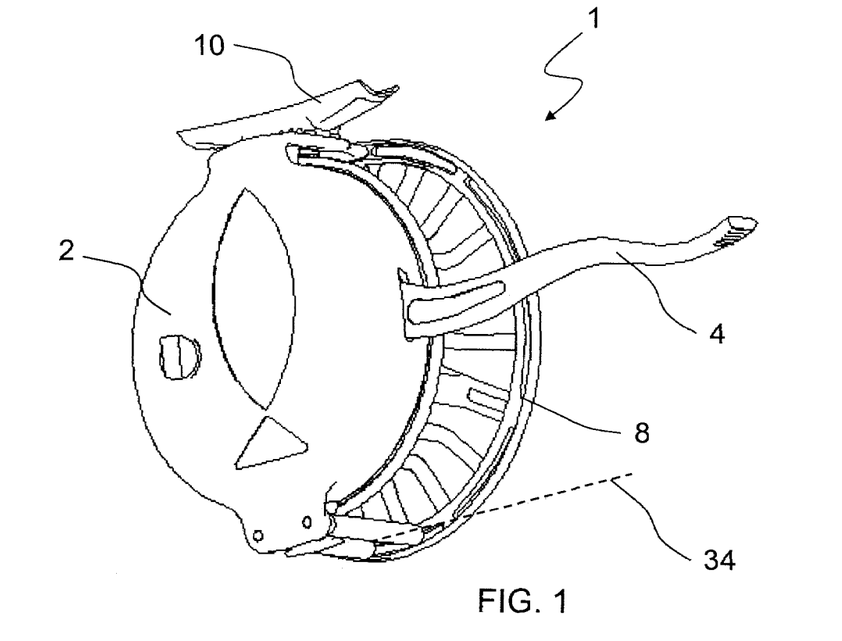
FIG. 1, a perspective view of a first embodiment of the reel according to the invention on the housing side.
Figure 2:
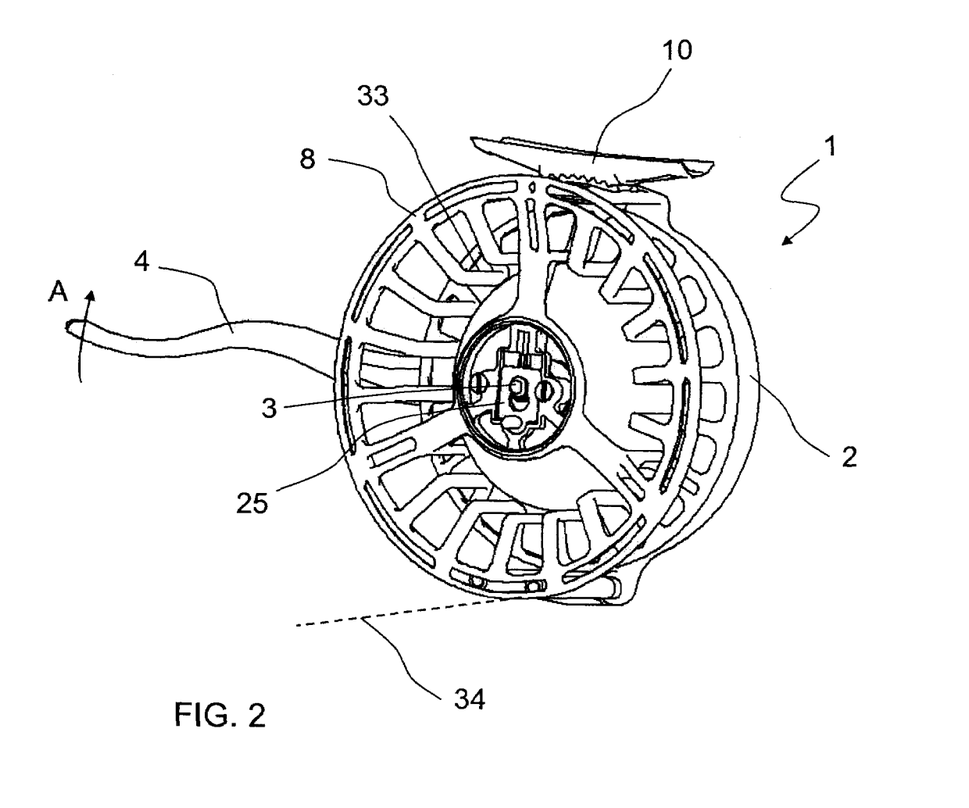
FIG. 2, a perspective view of the first embodiment of the reel on the spool side.

There follows a description of the feed-out movement of line 34 from spool 8. When line 34 (shown diagrammatically by the dotted line in FIGS. 1 and 2) is pulled, spool 8 rotates in the clockwise direction as shown in FIG. 2. Spool 8 drags second pinion 18 in the same rotation direction. Since planet gear-carrier 17 is attached without the possibility of rotating on main axis 3, planet gears 16 rotate on themselves in their support axes and drag ring gear 15, which rotates in the anti-clockwise direction shown in FIGS. 2 and 3.

Figure 3:
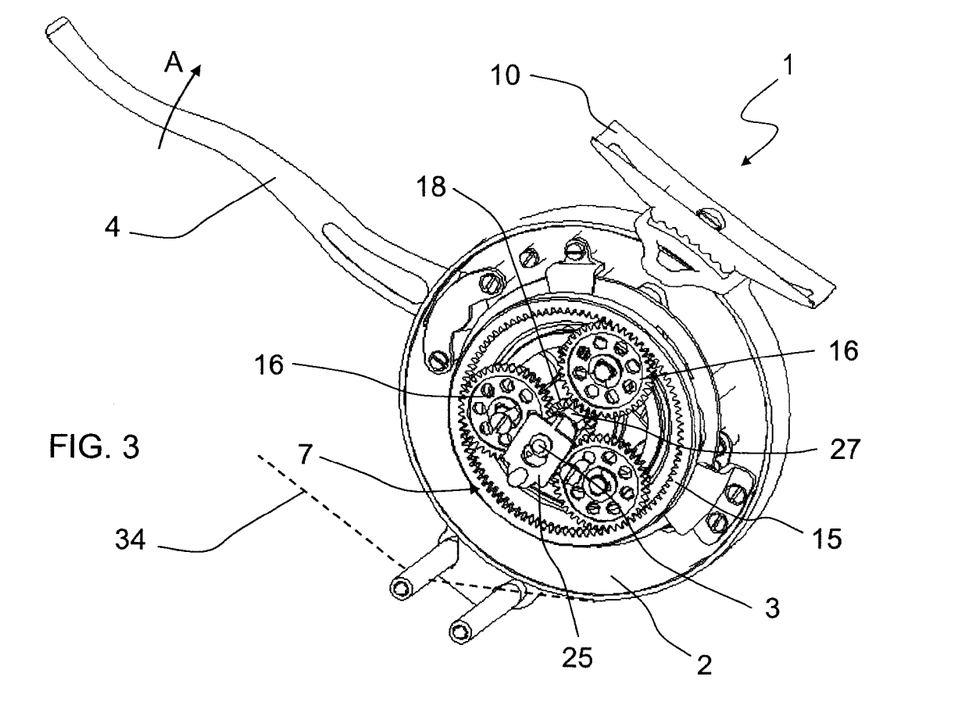
FIG. 3, a perspective view of the first embodiment of the reel on the spool side, with the spool disassembled.
Figure 4:
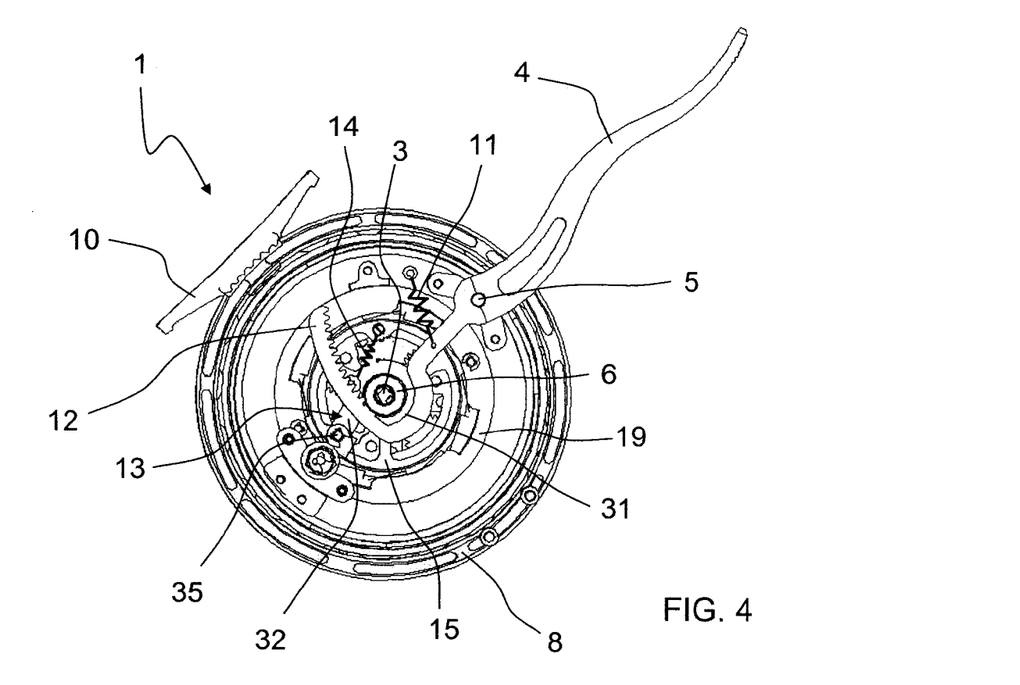
FIG. 4, a front view of the first embodiment of the reel on the housing side, with the housing disassembled.
Figure 5:
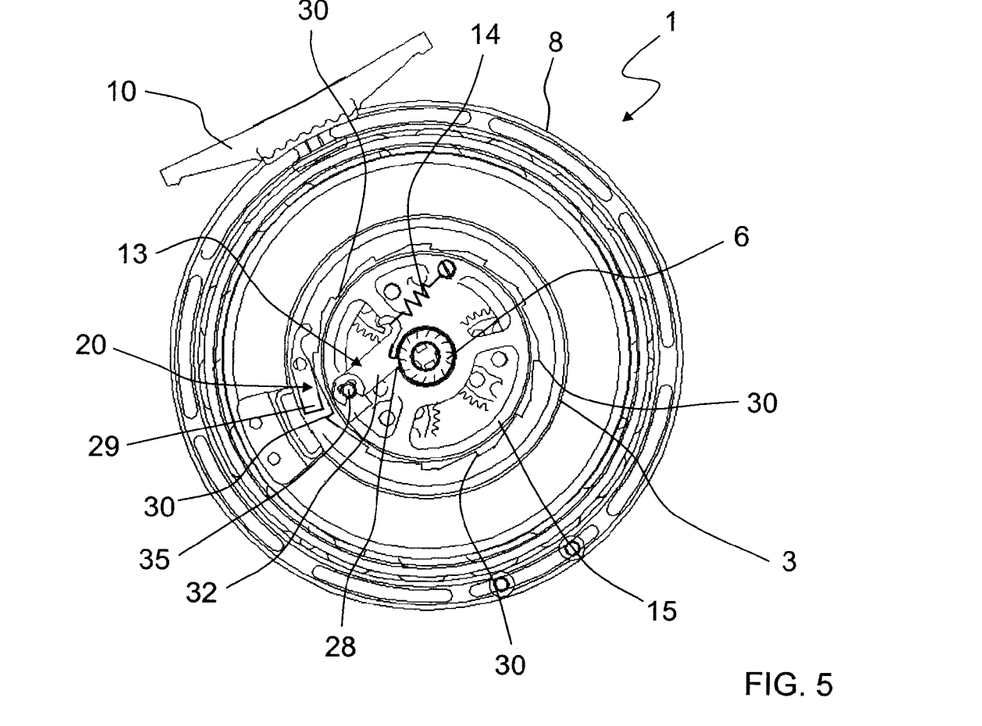
FIG. 5, a front view of the first embodiment of the reel on the housing side, without the housing, lever or braking device.
Figure 6:
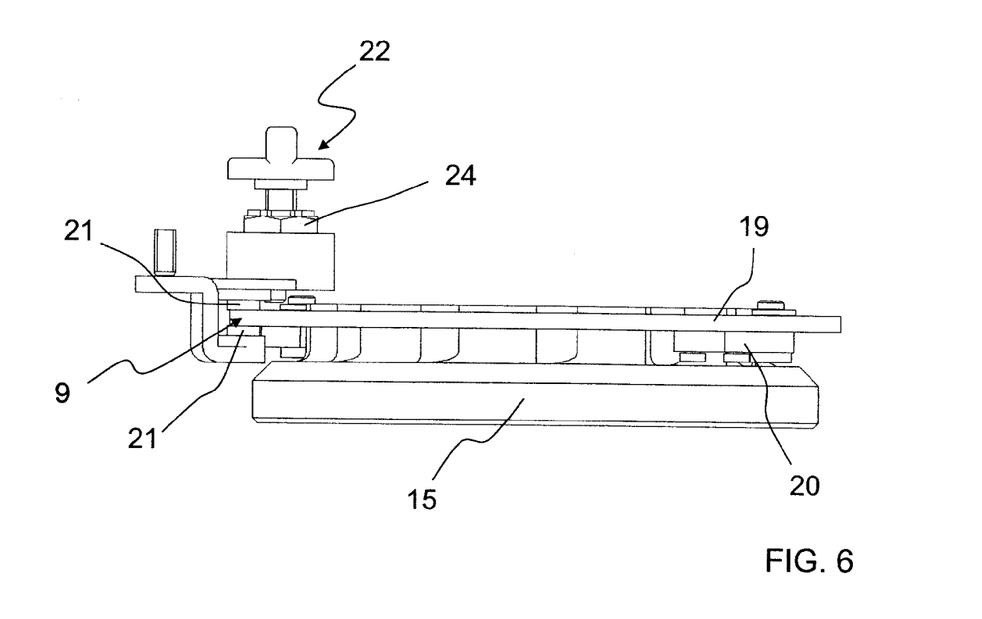
FIG. 6, is a front view of the braking device of the first embodiment.
Figure 7:
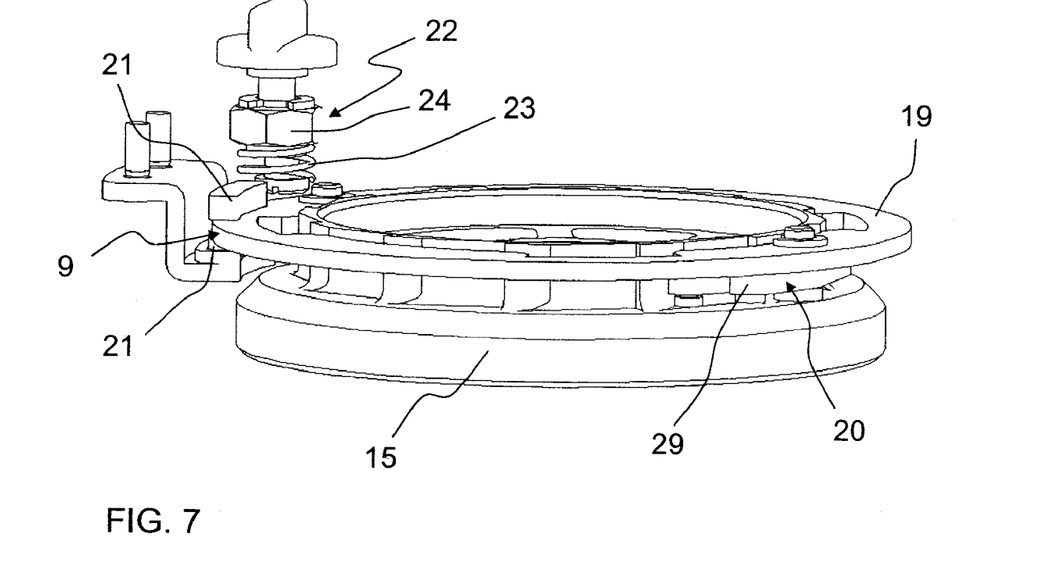
FIG. 7, is a perspective view of the braking device of the first embodiment.
Figure 8:
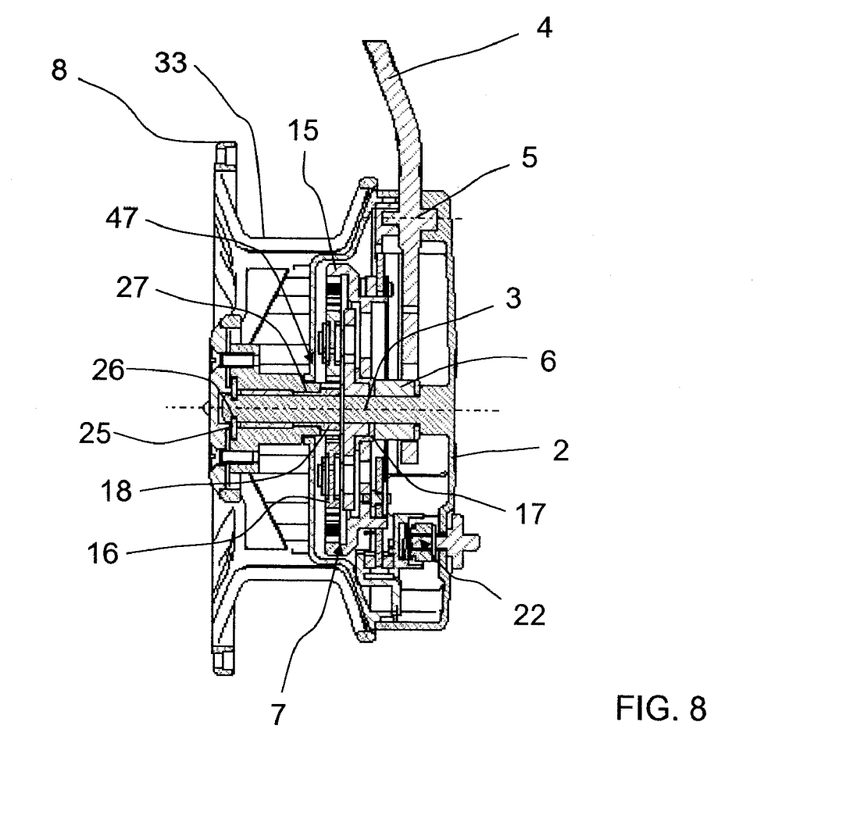
FIG. 8, is a longitudinal section along a first embodiment of the reel according to the invention.
Figure 9:
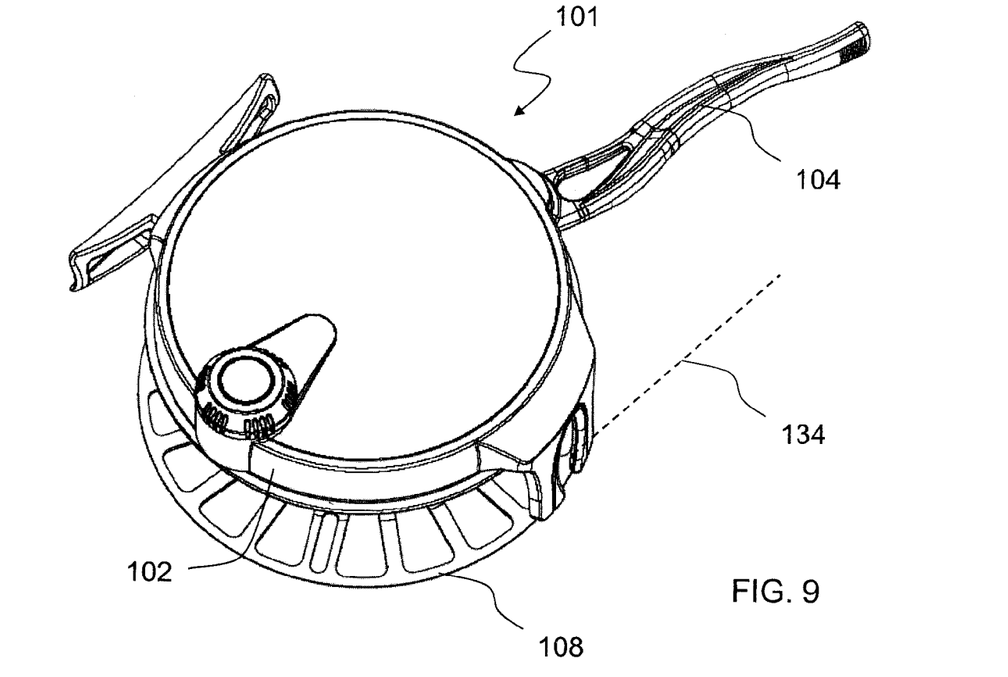
FIGS. 9 to 16, a second embodiment of the reel according to the invention.
Figure 10:
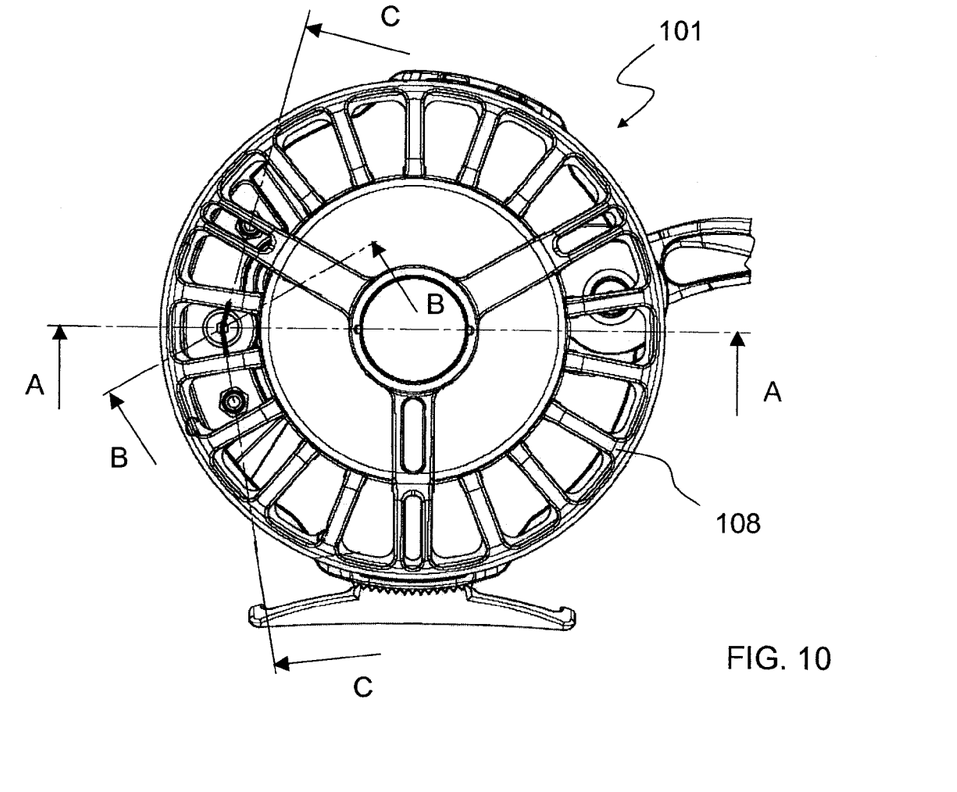
Figure 11:
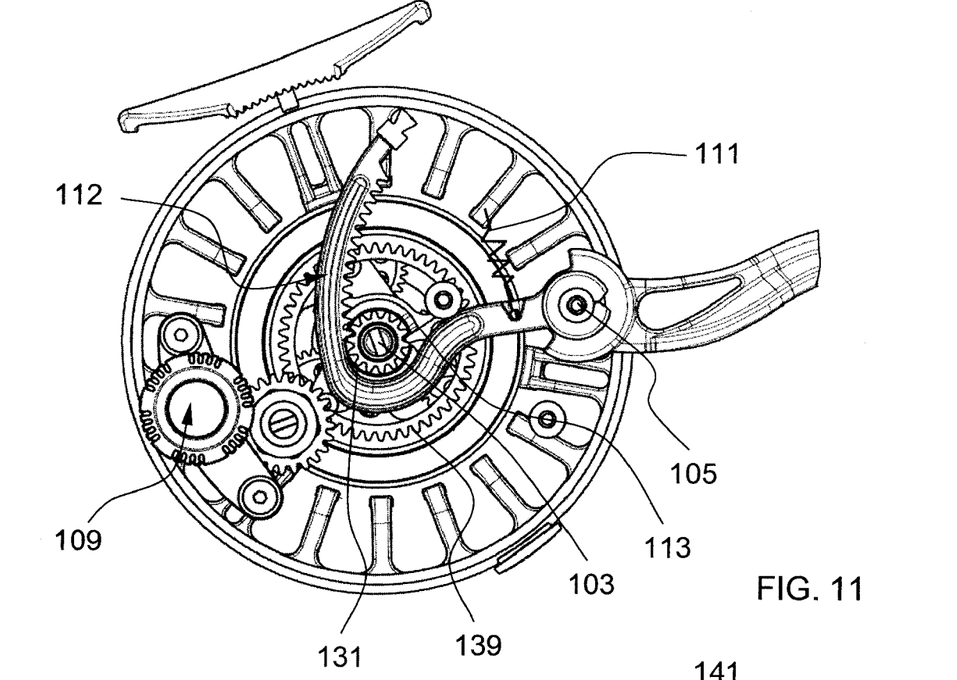
Figure 12:
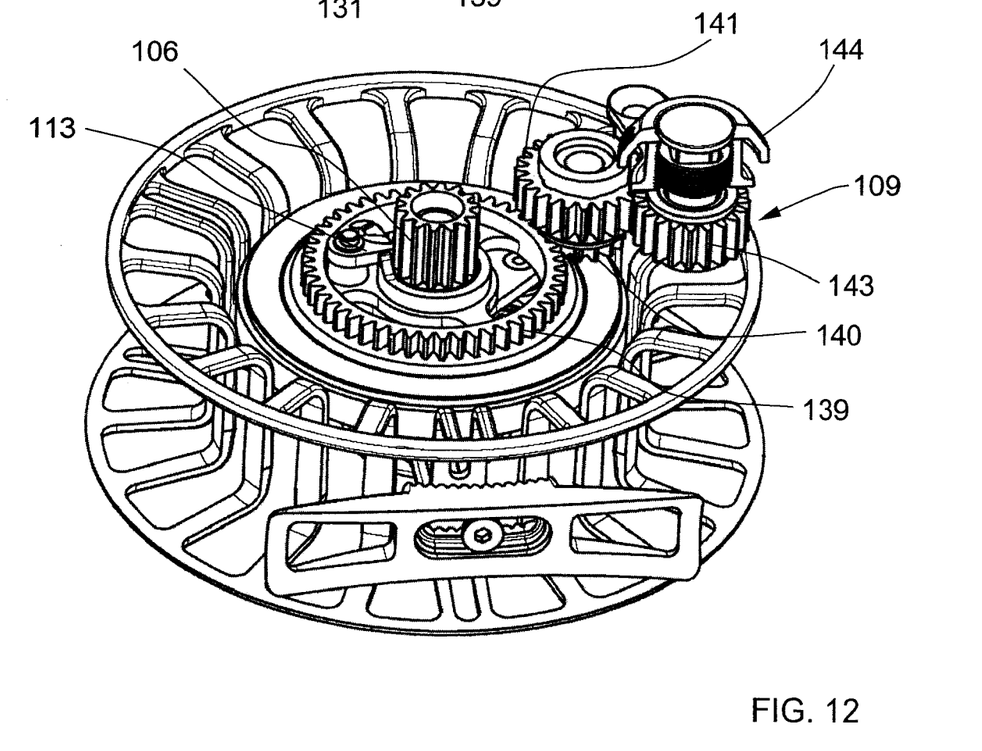
Figure 13:
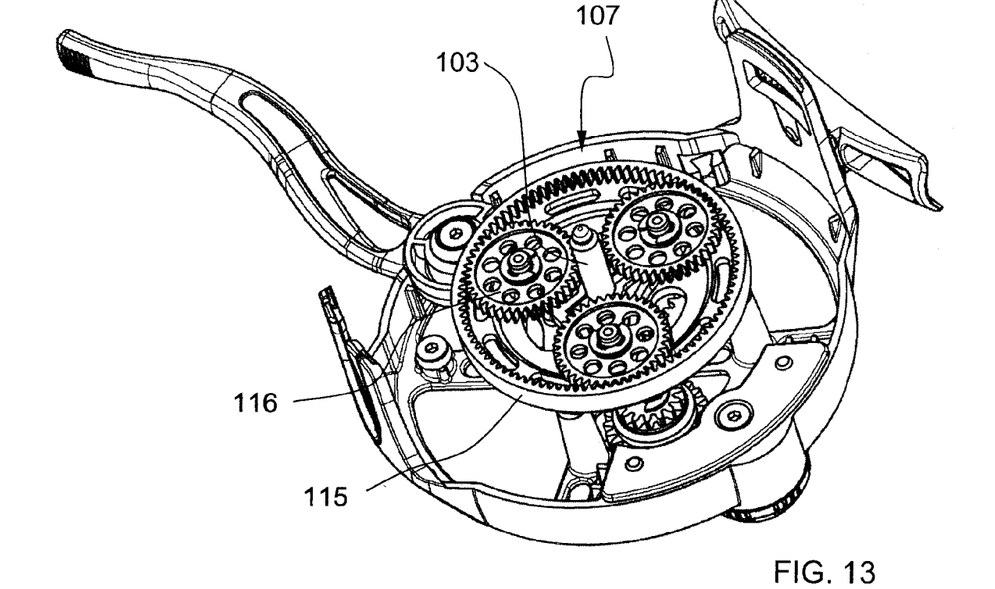

With reference now to FIGS. 4 and 5, the rotation direction of ring gear 15, which in FIGS. 2 and 3 is anti-clockwise, in FIGS. 4 and 5 is in the clockwise direction during the line feed-out movement. Consequently, ring gear 15, rotating in the clockwise direction according to FIGS. 4 and 5, drags one-way clutch 13. When first pawl 32 interlocks on first pinion 6 via appendix 28, ring gear 15 drags first pawl 32 and first pinion 6 together. When it moves, first pinion 6 can rotate freely in the clockwise direction in FIG. 4, because lever 4 at the end of the gearing sector 12 is provided with a saddle 31 that does not have any gear teeth, so that it does not mesh with first pinion 6. Consequently, during this movement, lever 4 and ring gear 15 are mechanically disconnected.

Simultaneously, the brake's free wheel mechanism 20 starts to operate, in other words, pawl 29 meshes with gear teeth 30 provided on ring gear 15, making brake disc 19 rotate with ring gear 15. So, brake blocks 21, which always compress brake disc 19, when braking the action of disc 19 and consequently ring gear 15, offer resistance to the feed-out of line 34 to counteract the force of the fish.

When it is desired to retrieve line 34 to gather the catch or re-cast, lever 4 is activated in the direction of arrow A in FIGS. 2 or 3. Lever 4 swivels around secondary axis 5 and with its geared sector 12 meshed with first pinion 6, it causes first pinion 6 to rotate in the anti-clockwise direction in FIG. 4. Consequently, appendix 28 interlocks in the gearing in first pinion 6 and first pawl 32 drags ring gear 15 in the same rotation direction as first pinion 6.

Now, observing FIG. 2 or 3, ring gear 15 would rotate in the clockwise direction, corresponding to the anti-clockwise direction in FIG. 4. When rotating, said ring gear drags planet gears 16, which make second pinion 18 rotate, and consequently spool 8, in the anti-clockwise direction. In this way, spool 8 winds the line bringing the fish closer. At this point it is important to highlight that the brake's free wheel mechanism 20, in other words corresponding second pawl 29, slips over gear teeth 30 on ring gear 15. In this way, brake disc 19 remains immobile while ring gear 15 rotates in the clockwise direction in FIG. 2. This implies that during retrieval of line 34 the brake is inactive, which is particularly advantageous, because if the brake is active during the retrieval process of line 34 it just makes reel 1 slower and increases the force required by the angler.

Moreover, it is also important to mention the additional advantage obtained by the fact that brake 9 is independent from the kinematic driving chain and that it only works when it is really necessary, in other words, in the feed-out of line 34 from spool 8. That is, brake 9 does not behave like a clutch. This prevents the brake acting as a torque limiter when the captured fish is particularly large. Consequently, it is guaranteed that driving lever 4 works effectively at all times, in other words, all the force applied by the user to lever 4 is actually transmitted to spool 8.

In this embodiment, mention must also be made of the diameter of spool 8. With the known semi-automatic and automatic reels, since the brake mechanism slips and hinders the retrieval function when the tension on line 34 is very high, it is not possible to catch relatively large fish unless by hand, in other words, without using the reel and just pulling line 34. So, with these reels the diameters of spool 8 are always small, and so they are not suitable for winding higher calibre lines. According to the invention, since the braking mechanism of reel 1 is disconnected from the mechanisms that transmit the force from the lever, all kinds of fish can be caught, and therefore all kinds of calibres of line 34 can be used. Furthermore, the applicant has noticed during the development of the invention that the greater the calibre of line 34, the greater its shape memory effect. Therefore, another of the improvements of the invention that is worth highlighting is that it provides a spool 8 with a larger diameter, and in particular larger than 70 mm. The large wind up diameter of spool 8 reduces the shape memory effect, and therefore the performance of the rod is improved, as greater casting distances can be reached.

Figure 14:
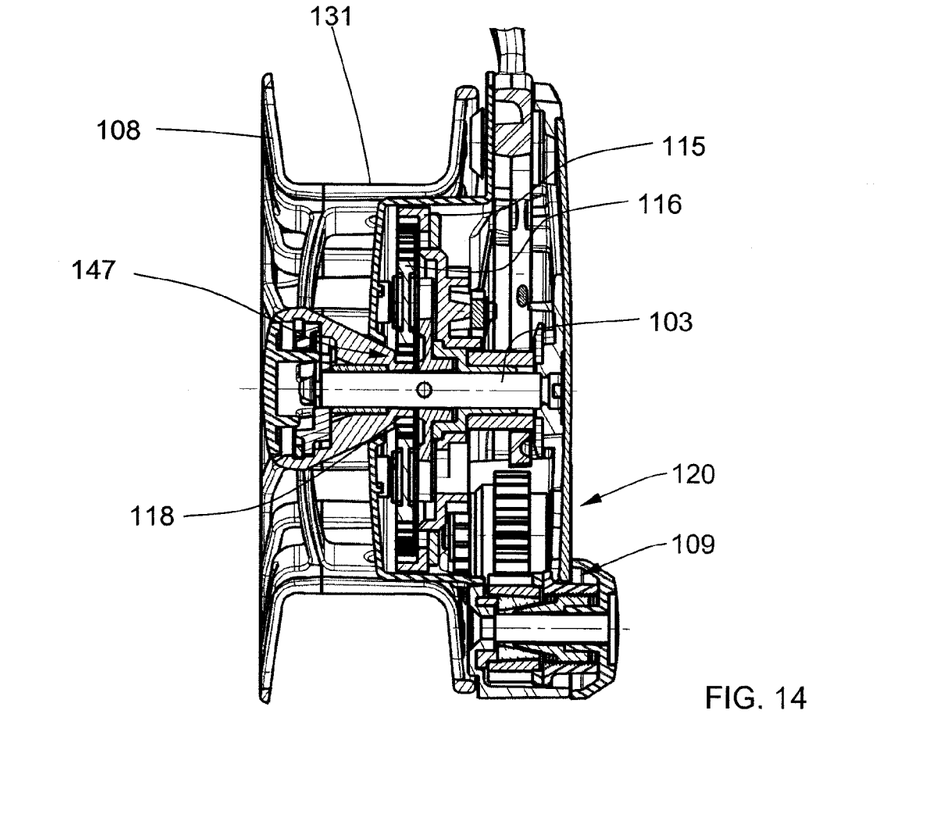
Figure 15:
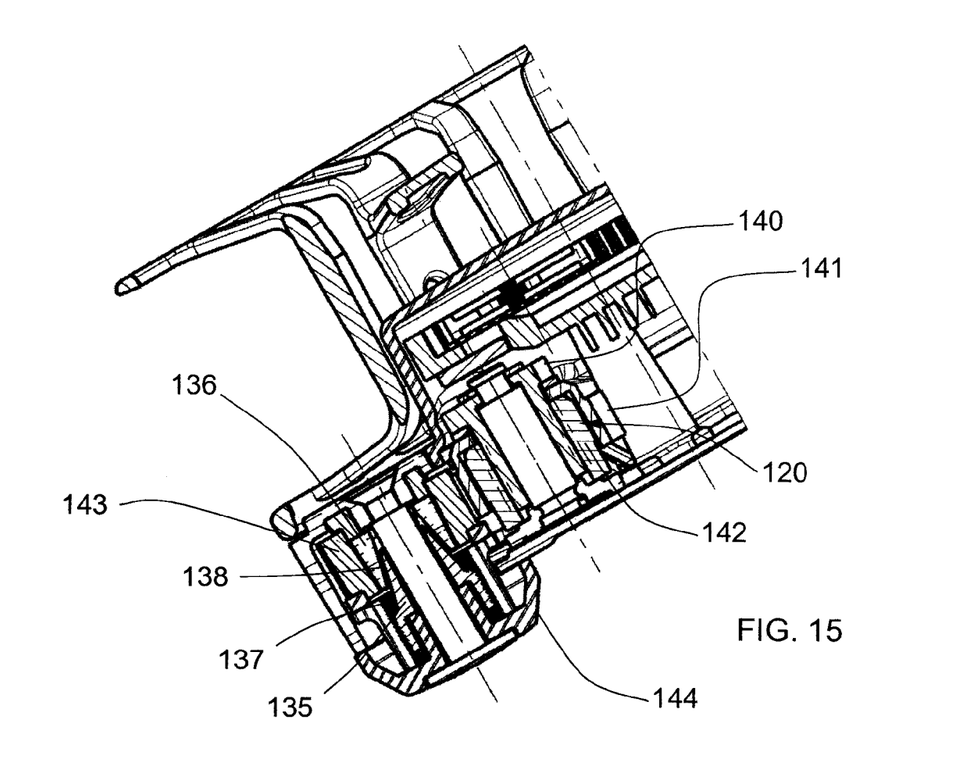
Figure 16:
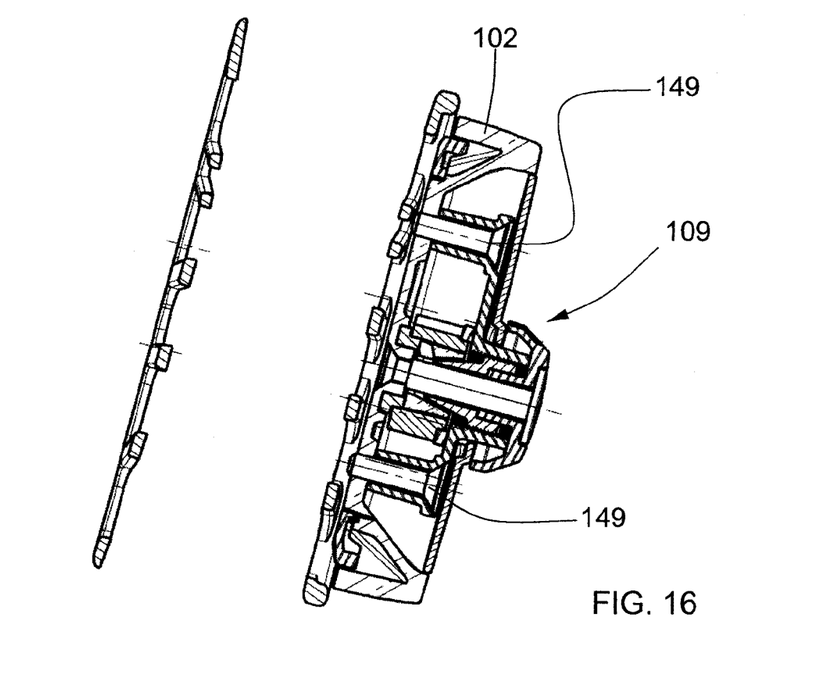
Figure 17:
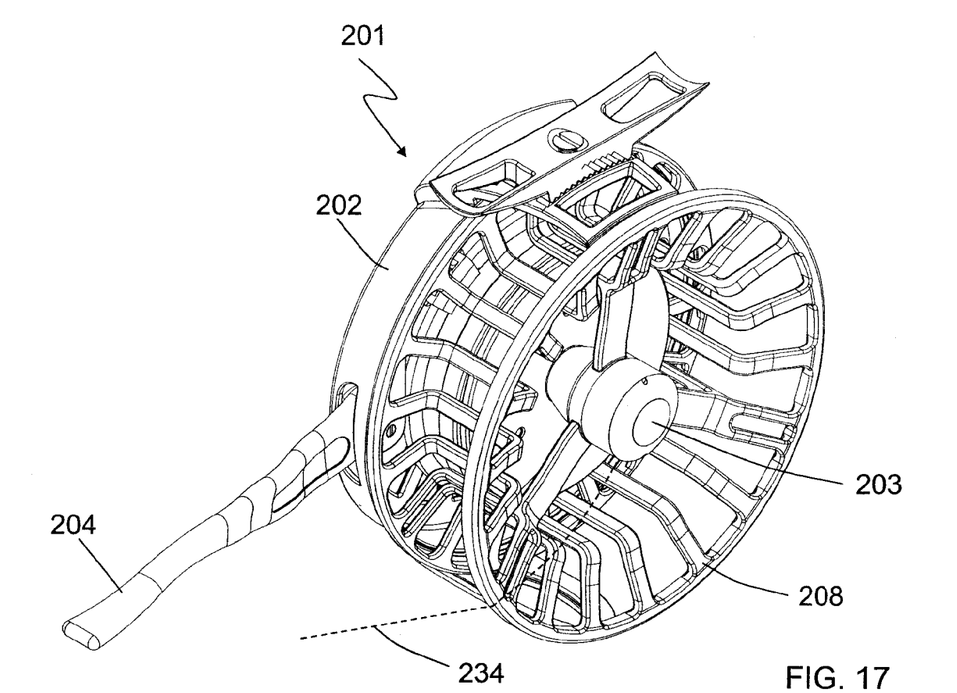
FIGS. 17 to 22, a third embodiment of the reel according to the invention.
Figure 18:
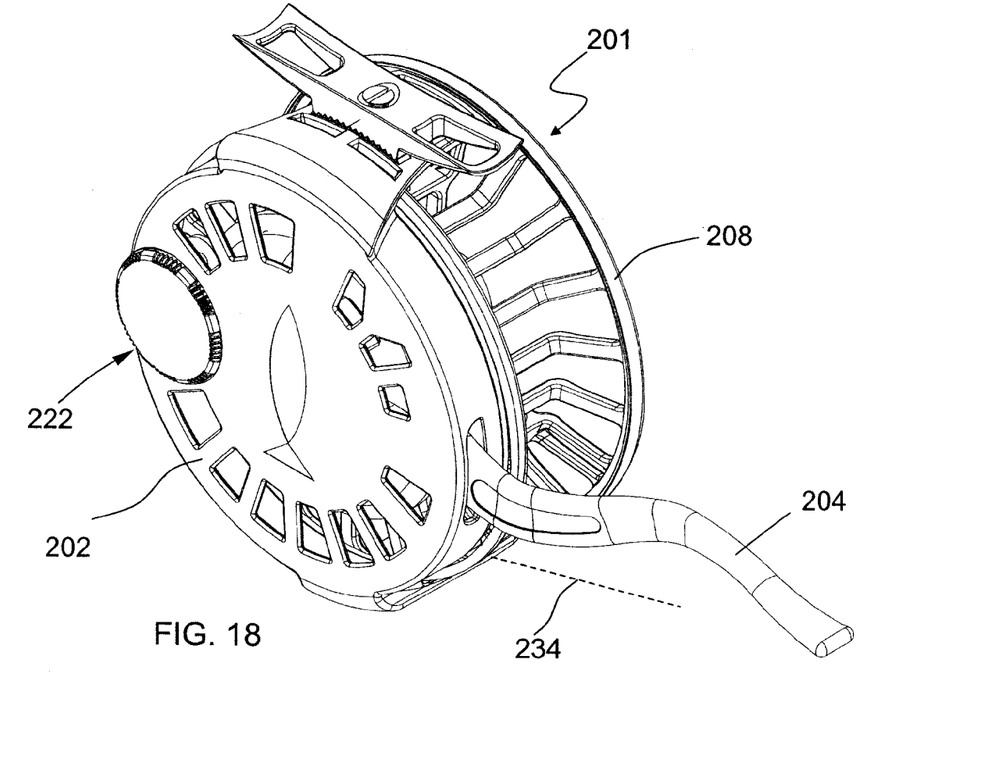
Figure 19:
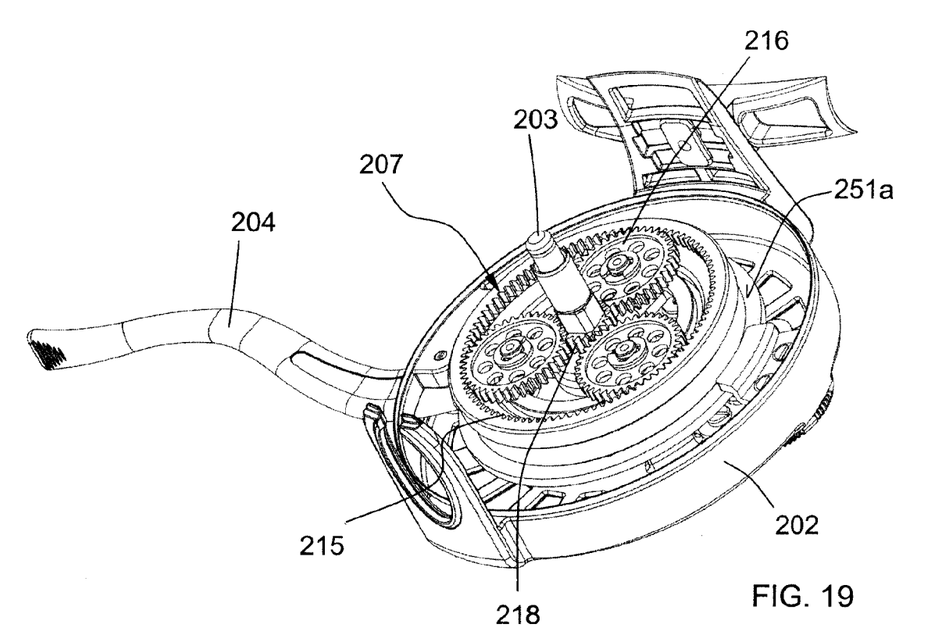

FIGS. 9 to 16 show a second embodiment of the reel. FIGS. 14, 15 and 16 show sections along the lines A-A, B-B and C-C of FIG. 10 respectively. As can be seen particularly clearly in the section shown in FIG. 15, brake 109 of reel 101 comprises a first ring 135 and a second ring 136. First ring 135 has a first conical outer surface 137 that cooperates with second conical inner surface 138 of second ring 136 to produce the corresponding braking torque.

Also, second ring 136 has a fifth pinion 143 that meshes with a fourth pinion 141 that is part of free wheel mechanism 120. Free wheel mechanism 120 also comprises a one-way bearing 142 with a third pinion 140 which, in turn, meshes with a first outer gear teeth 139 provided on ring gear 115 of gearing 107.

In this embodiment, the force of the brake is regulated by regulating means 122. Cap 144 has a positive locking with first ring 135 in the form of a hexagonal screw. First ring 135 has an outer thread 145 which, as can be seen in detail in the section in FIG. 16, is guided in the inner thread 148 of a bushing 146, fixed to housing 102 by screws 149. So, when cap 144 is activated in the tightening direction of brake 109, first conical surface 137 of first ring 135 presses against second conical surface 138, which increases the friction between both surfaces and therefore increases the braking torque.

When the user casts or a fish pulls on line 134 as explained above, ring gear 115 and second ring 136 are kinematically linked by first outer gear teeth 139 on ring gear 115, free wheel mechanism 120 and fifth gear 143. During the feed-out movement of line 134, free wheel mechanism 120 is active. So, when ring gear 115 rotates, with its first outer gear teeth 139 it drags third pinion 140, which communicates the movement to fourth pinion 141 through one-way bearing 142. Fourth pinion 141 drags fifth pinion 143 of second ring 136. Finally, second ring 136 is braked by the relative friction between first and second conical surfaces 137, 138, which brakes the feed-out of line 134.

When the user retrieves the line using lever 104, free wheel mechanism 120 is deactivated, in other words, one-way bearing 142 does not transfer the movement of third pinion 140 to fourth pinion 141, whereby brake 109 remains inactive.

Brake 8 comprises a brake disc 10 in the shape of a ring mounted whereby it floats, externally and concentrically on an outer blocking diameter 35 of ring gear 24. Brake disc 10 is caused to brake by two brake blocks 11a, 11b. In this embodiment the first break block 11a is integral with housing 2 and acts upon a first surface 36a of disc 10, whereas the second break block 11b can be moved in the direction perpendicular to the second surface 36b of brake disc 10 by means 18 for regulating the force of brake 8. In particular, said regulating means 18 are made up of a take-up screw 20 that compresses a take-up spring 19. When compressed, take-up spring 19 pushes against second movable brake break block 11b. This embodiment is particularly robust, because the small parts that move are the minimum essential parts. However, it would be feasible for both brake blocks 11a and 11b to be able to move with respect to disc 10, whereas the disc would be mounted fixedly in the direction of main axis 31 on outer blocking diameter 35 of ring gear 24.

FIGS. 17 to 22 show a third embodiment of the reel. Brake 209 comprises a brake disc 219 in the form of a ring mounted floating, externally and concentrically on an outer blocking diameter 250 of ring gear 215. Brake disc 219 is caused to brake by two brake blocks 221a, 221b. In this embodiment the second break block 221b can be moved in the direction perpendicular to the second surface 251b of brake disc 219 by means 222 for regulating the force of brake 219. In particular said regulating means 222 are made up of a take-up screw 224 that compresses a take-up spring 223. When compressed, take-up spring 223 pushes against second movable break block 221b. This embodiment is particularly robust, because the small parts that move are the minimum essential parts. However, it would be feasible for both brake blocks 221a and 221b to be able to move with respect to disc 219, whereas disc 219 would be mounted fixedly in the direction of main axis 203 on outer blocking diameter 250 of ring gear 215.

Figure 20:
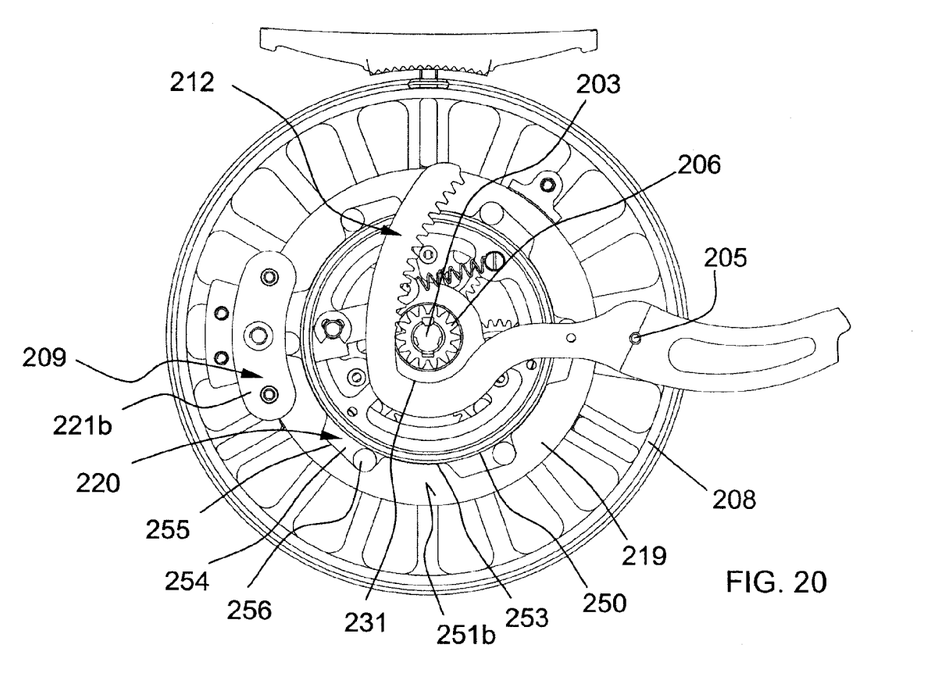
Figure 21:
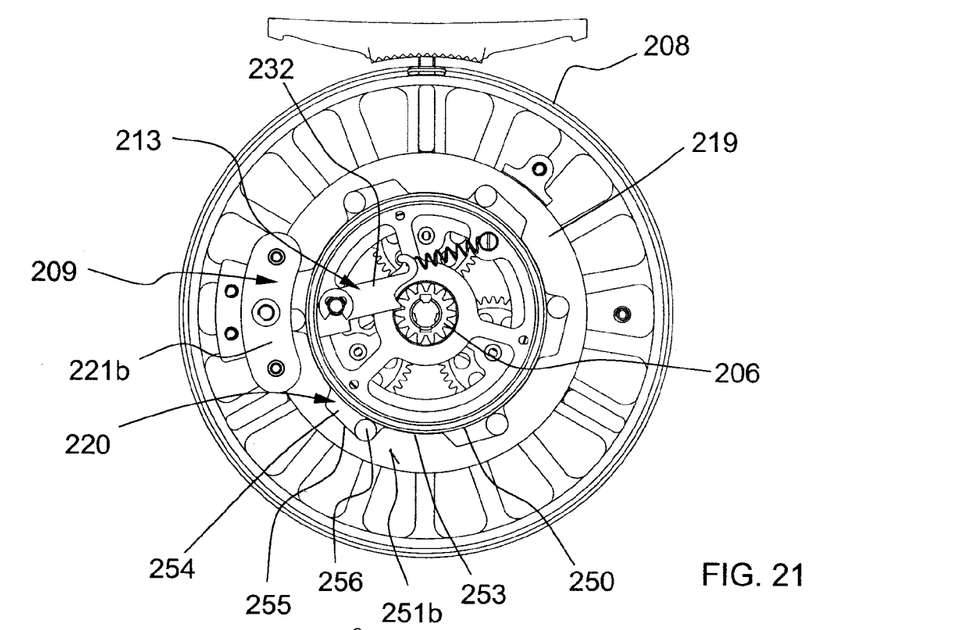
Figure 22:
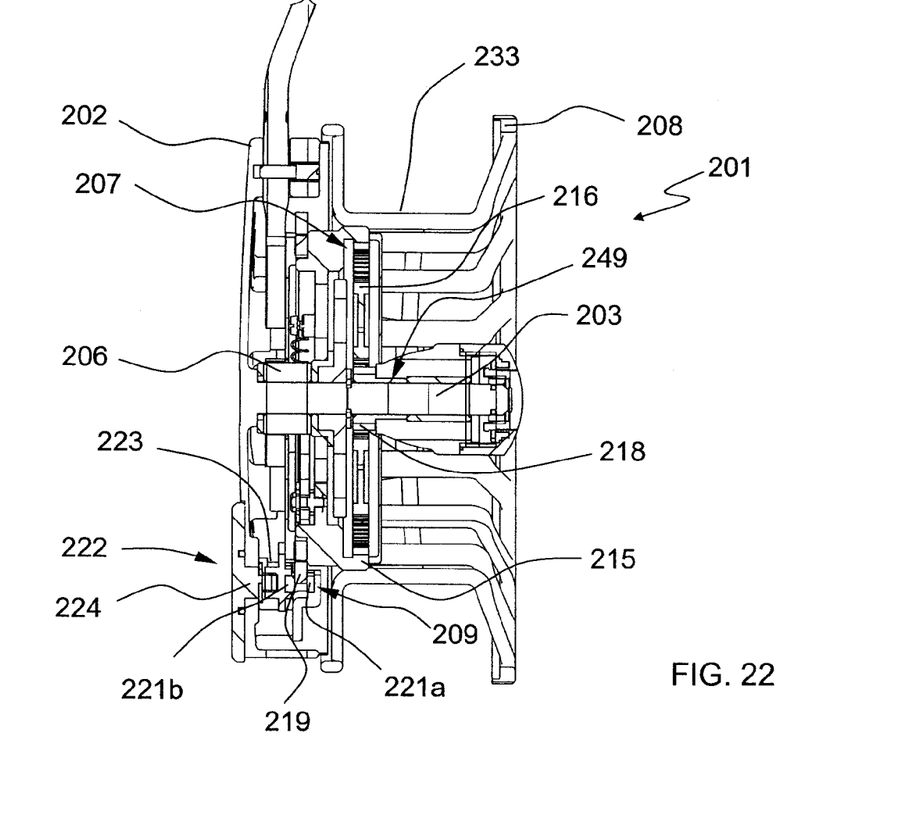

As can be seen in FIGS. 20 and 21, brake disc 219 has some notches 254 in its inner diameter 253 and the part of said notches located furthest from inner diameter 253 has the shape of a slope 255. Also between each notch 254 of brake disc 219 and outer blocking diameter 250 of ring gear 215 a rolling body 256 is provided. This unit forms free wheel mechanism 220 in this embodiment. When ring gear 215 rotates in the clockwise direction in FIG. 20, it drags said rolling bodies 256 in the same direction. So, rolling bodies 256 are blocked between ring gear 215 and brake disc 219, whereby brake disc 219 is dragged by ring gear 215, also in the clockwise direction. As already mentioned, brake blocks 221 that are always compressed by take-up spring 223 pressing on brake disc 219, produce a braking torque that can be regulated continuously from 0 Nm to completely blocking brake disc 219 and therefore the rotation of spool 208.

In the three embodiments, the complete blocking of brake 9, 109, 209, makes it easier to remove the catch from the hook, because when the catch is on the shore, line feed-out can be completely avoided. For example, if the fish slips from the angler's hand just before removing the hook, the fish cannot move away from the shore.

The operating principle of reel 201 both for feeding-out and retrieving line 234 is similar to those described above.

As shown in the description, reel 1, 101, 201 according to the invention improves various aspects of the known, state of the art reels. So, the line retrieval speed is considerable improved, which allows the angler to react much more efficiently to the force of the fish. Moreover, thanks to the greater length of line retrieved each time the driving lever is activated, it is possible to reduce the rod 's lurching movement with respect to the number of times that the rod lurches and the magnitude of the lurching action. The invention also proposes a much more efficient brake since it is only active at the times it is really needed. Finally, the invention can be used with all kinds of line calibres, with the subsequent advantages that this implies, in other words that the semi-automatic reel can be applied to all kinds fly fishing techniques, which does not happen with the semi-automatic and automatic reels of the state of the art.

The invention claimed is:

1. Fly fishing reel comprising
  [a] a housing (2, 102, 202)
  [b] a main axis (3, 103, 203)
  [c] a swivel driving lever (4, 104, 204),
  [d] elastic recovery means (11, 111, 211) for said lever (4, 104, 204) rest position,
  [e] a first pinion (6, 106, 206) driven by said driving lever (4, 104, 204), with said first pinion (6, 106, 206) being coaxial to said main axis (3, 103, 203),
  [f] a spool (8, 108, 208) for winding up line (34, 134, 234), provided coaxially to said main axis (3, 103, 203), and
  [g] a brake (9, 109, 209) of said spool (8, 108, 208), characterised in that
  [h] between said first pinion (6, 106, 206) and said spool (8, 108, 208) a gearing (7, 107, 207) is provided,
  [i] said gearing (7, 107, 207) comprising at least a planetary train,
  [j] comprising said planetary train a second pinion (18, 118, 218), at least three planet gears (16, 116, 216) and a ring gear (15, 115, 215), and

[k] said ring gear (15, 115, 215) being linked to said first pinion (6, 106, 206) via a first one-way clutch (13, 113, 213).

2. Fly fishing reel according to claim 1, characterised in that it comprises a secondary axis (5, 105, 205) parallel to said main axis (3, 103, 203), said driving lever (4, 104, 204) swivelling around said secondary axis (5, 105, 205), and in that said driving lever (4, 104, 204) comprises a gearing sector (12, 112, 212) on one end that meshes with said first pinion (6, 106, 206).

3. Fly fishing reel according to claim 1, characterised in that it comprises a second one-way clutch, said driving lever (4, 104, 204) comprising a saddle (31, 131, 231) that connects the end of said lever (4, 104, 204) with the beginning of said gearing sector (12, 112, 212), and in that said saddle (31, 131, 231) does not have any teeth, so in a feed-out direction of line (34, 134, 234), said first pinion (6, 106, 206) does not activate said driving lever (4, 104, 204).

4. Fly fishing reel according to any of the claims 1, characterised in that said planetary train comprises four of said planet gears (16, 116, 216).

5. Fly fishing reel according to claim 1, characterised in that
[a] said spool (8, 108, 208) is connected in a mechanically rigid manner to said gearing (7, 107, 207), with said gearing (7, 107, 207) and said spool (8, 108, 208) forming a rigid kinematic unit (49, 149, 249),
[b] the force of said brake (9, 109, 209) can be regulated continuously,
[c] said brake (9, 109, 209) comprises a free wheel mechanism (20, 120, 220) and said brake (9, 109, 209) acts upon said rigid kinematic unit (47, 147, 247), and
so that in the feed-out direction of line (34, 134, 234), said free wheel mechanism (20, 120, 220) is active, while in the wind up direction of line (34, 134, 234), said free wheel mechanism (20, 120, 220) is inactive.

6. Fly fishing reel according to claim 5, characterised in that said brake (9, 209) comprises break blocks (21, 221) that act upon a brake disc (19, 219), and in that said brake (9, 209) is outside the force gearing flow from said lever to said spool (8, 208).

7. Fly fishing reel according to claim 6, characterised in that said brake disc (19, 219) is to said ring gear (15, 215) and said break blocks (21, 221) are integral with said housing (2, 202).

8. Fly fishing reel according to claim 6, characterised in that said free wheel mechanism (20) comprises an outer gear teeth (30) on said ring gear (15) and in that a second pawl (29) on said brake disc (19), said free wheel mechanism (20) only working in the feed-out direction of said line (34).

9. Fly fishing reel according to claim 5, characterised in that said brake (109) comprises
[a] a first ring (135) with a first conical surface (137) and
[b] a second rotary ring (136) with a second conical surface (138), with said first and second conical surfaces being suitable to co-operate mutually to produce a braking torque, and in that
[c] said second ring (136) and said gearing (107) co-operate mutually via said free wheel mechanism (120).

10. Fly fishing reel according to claim 9, characterised in that
[a] said free wheel mechanism (120) comprises a one-way bearing (144), said one-way bearing comprising (144) a third pinion (142), and a fourth pinion (143),
[b] said second ring (138) comprises a fifth pinion (145) and
[c] said ring gear (115) of said gearing (107) comprises a first outer gear teeth (139),
so that said fifth pinion (144) meshes with said fourth pinion (143), while said third pinion (142) meshes with said ring gear (124).

11. Fly fishing reel according to claim 1, characterised in that said brake (9, 209) comprises regulating means (22, 222) for the braking tension, with said regulating means (22, 222) being made up of a take-up spring (23, 223) and a take-up screw (24, 224).

12. Fly fishing reel according to claim 1, characterised in that said spool (8, 108, 208) has an inner retrieval diameter (33, 133, 233) for line (34, 134, 234) and in that said inner diameter (33, 133, 233) is greater than 70 mm.

* * * * *